W. W. LOBDELL.

CHILLED CAR WHEELS.

No. 7,045. Reissued April 11, 1876.

Witnesses
Harry Hayden Jr
Harry Smith

William W. Lobdell
by his Attorneys
Howson and Son

N. PETERS, PHOTO-LITHOGRAPHER, WASHINGTON, D. C.

UNITED STATES PATENT OFFICE.

WILLIAM W. LOBDELL, OF WILMINGTON, DELAWARE.

IMPROVEMENT IN CHILLED CAR-WHEELS.

Specification forming part of Letters Patent No. 172,461, dated January 18, 1876; reissue No. 7,045, dated April 11, 1876; application filed March 16, 1876.

*To all whom it may concern:*

Be it known that I, WILLIAM W. LOBDELL, of Wilmington, Delaware, have invented certain Improvements in Railroad-Car Wheels, of which the following is a specification:

The object of my invention is to render chilled car-wheels of cast-iron more durable than heretofore, and this object I attain in the manner which I will now proceed to describe, reference being had to the accompanying drawing.

Figure 1:
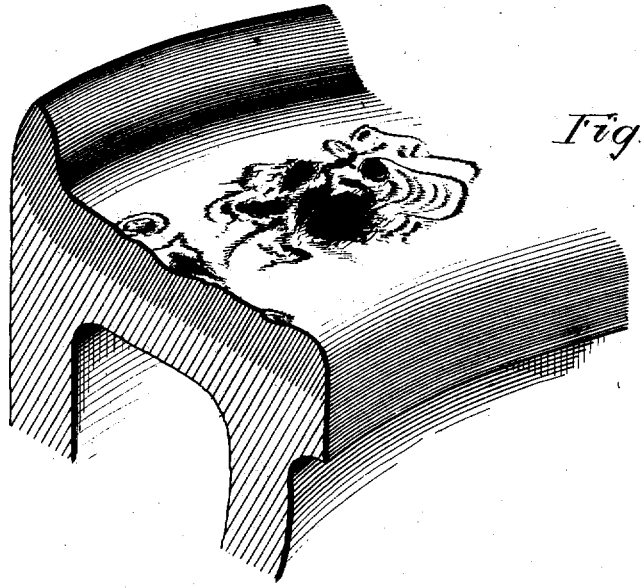
Figure 2:
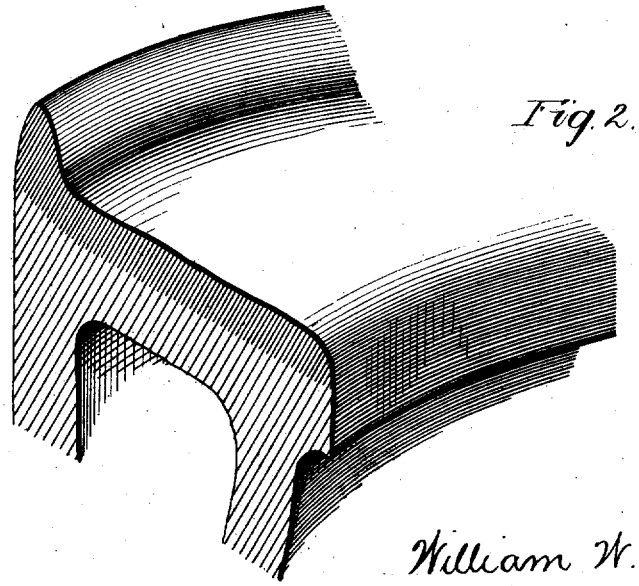

It has been the practice in manufacturing ordinary car-wheels to cast them in chills, which harden the peripheries or treads of the rims, the latter being simply cleaned and not subjected to any turning or other truing process before they are put into use, for prior to my invention the preservation of the chill has been considered essential. Under light loads these ordinary chilled wheels will retain their integrity for a considerable time, but under heavy loads the chilled tread of a wheel of this class is apt to become damaged, partly owing to a slight untruth of, or imperfections in the rim, and partly to inequalities in the track, either of which must necessarily result in the repeated concussions of the chilled tread, and finally in wounding the same by the forcible removal of pieces of metal at those points which have been subjected to the most severe and frequent concussions. Another source of damage is the repeated retention by the brakes, of the wheels, on which flat places are worn by slipping on the rails. Defects also owe their origin to incipient imperfections in the castings beneath the skin, which is frequently fractured where these imperfections occur and the fractures increasing in size until they become the serious wounds which are shown in Fig. 1 of the accompanying drawing, and which necessitate the discarding of the wheel. Two chilled wheels, moreover, on the same axle may not be of the same diameter, or may be relatively untrue, in which cases the sides of one or both of the flanges hug the rails so closely as to result in the rapid wearing of the said flanges. I obviate this evil by turning, grinding, or otherwise truing the chilled tread, (see Fig. 2,) so that the rims and inside of the flanges shall be circumferentially true, and free from those incipient imperfections which in ordinary chilled wheels become, under the severe usage to which they are subjected, the serious wounds to which I have alluded, so much of the rim being cut or ground away that the latent defects referred to above are removed.

I have found by long-continued tests that cast-iron chilled wheels, thus turned at the treads and flanges, remain perfect and free from these wounds and proof against the defects referred to above, after long and severe usage, and that ordinary wheels which have been injured in the manner described, can be so turned as to remove all the wounds, and thereby rendered serviceable for further and long-continued use.

I claim as my invention, and as a new article of manufacture—

1. A cast-iron car-wheel, having a chilled and trued rim, as herein set forth.

2. A cast-iron car-wheel, from the chilled rim of which the defects beneath the skin of the chill have been removed, as specified.

In testimony whereof I have signed my name to this specification in the presence of two subscribing witnesses.

WILLIAM W. LOBDELL.

Witnesses:
P. N. BRENNAN,
A. MCLEOD.